(No Model.)
J. S. KEMP.
FERTILIZER DISTRIBUTER.
No. 269,585.           Patented Dec. 26, 1882.
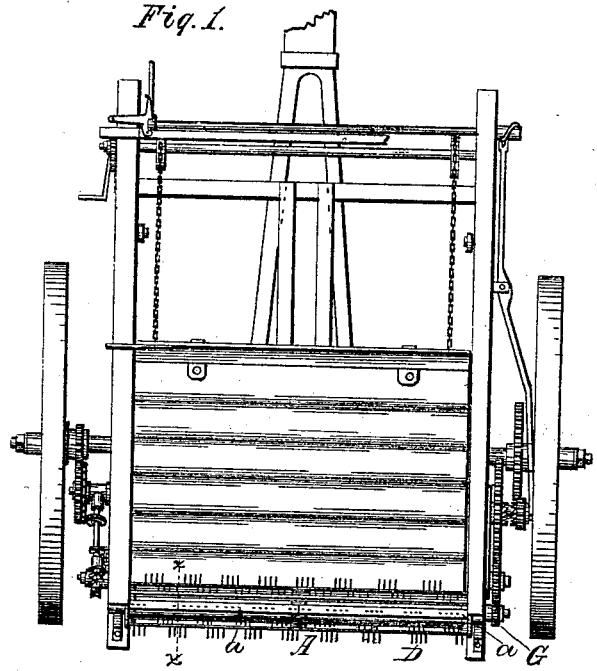
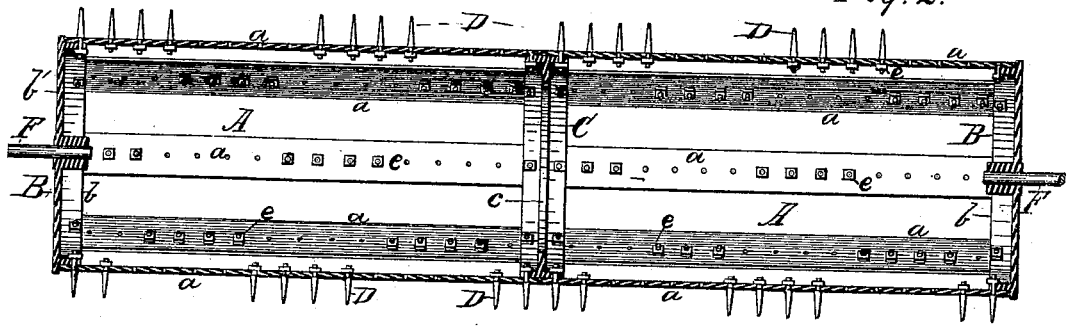
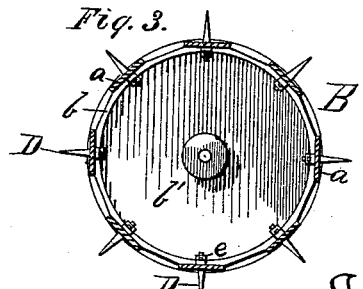
Witnesses:
Inventor:
Joseph S. Kemp.
per Wiswell Lange
Attorneys.

UNITED STATES PATENT OFFICE.

JOSEPH S. KEMP, OF MAGOG, QUEBEC, CANADA.

FERTILIZER-DISTRIBUTER.

SPECIFICATION forming part of Letters Patent No. 269,585, dated December 26, 1882.

Application filed April 15, 1882. (No model.)

*To all whom it may concern:*

Be it known that I, JOSEPH SARGENT KEMP, a citizen of the Dominion of Canada, residing at Magog, in the county of Stanstead and Province of Quebec, Canada, have invented certain new and useful Improvements in Fertilizer-Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the fertilizer-distributer covered in the Letters Patent granted to me May 1, 1877, No. 190,220, reissued May 28, 1878, No. 8,254, and Letters Patent No. 241,023, dated May 3, 1881.

As this my present improvement is confined solely to the "drum" or "beater" for distributing the fertilizing material as it is carried backward in the body of the cart by the movable bottom, reference is made to the patents above mentioned for a description of the nature and operation of the machine in general. Heretofore I employed a solid cylinder of wood, provided with teeth or cutters driven therein, as the drum or beater. Such a beater is objectionable, in that the teeth or cutters driven into the wood becoming bent, broken, or worn cannot well be replaced; and, further, the drum swells and shrinks and cracks with the weather. Again, since the beater revolves rapidly when the machine is in operation, to cause an even distribution of fertilizing material it is necessary that the said beater be nicely balanced, to prevent undue strain in the parts and insure their proper operation. This condition is not only hard to be fulfilled in the construction of the machine, but is also difficult to be preserved when in use in the field, and subject to all kinds of weather.

My invention is designed to overcome these objections, to permit the quick and easy substitution of new teeth or cutters for worn, bent, or broken ones, to provide for the arrangement of a greater or less number of teeth on the beater and their easy removal therefrom, as may be deemed advisable or necessary when alternately working heavy coarse manure or fine pulverulent fertilizer, and to obtain a better and more durable beater.

To these ends my invention consists of a drum or beater composed of slats, and provided with teeth removably secured thereto, constructed and arranged substantially as hereinafter fully described, and particularly pointed out in the claims.

Referring to the drawings, Figure 1 is a plan view of my fertilizer-distributer, showing my improved drum or beater as forming part thereof. Fig. 2 is a central longitudinal section of my improved drum or beater, and Fig. 3 is a transverse vertical section of the beater on line $x\ x$ of Fig. 1.

Corresponding parts in the several figures are denoted by similar letters of reference.

In the annexed drawings, A marks the drum or beater, composed of a number of slats, $a$, removably secured to the heads B and the central supporting-ring, C, and provided with a number of teeth, D, removably attached to said slats. In the present instance the slats are made of iron, and a e secured to the lateral polygonal flange $b$ of the heads B by means of bolts passing through said slats and flange and secured with nuts. The flange $b$ is cast in one piece with the disk $b'$ and journal-hub to form one of the heads B, as clearly shown in the drawings. The disk $b'$ extends vertically beyond the flange $b$ a distance about equal to the thickness of the slats, so as to protect their ends, and also provide a smooth even surface at that point to insure a snug fit with the sides of the body.

The slats are secured to the central supporting-ring, C, with bolts in like manner as to the heads. The ring C may have flat surfaces or facets to receive the slats, if desired, and, further, may be strengthened with a web, $c$, as shown in Fig. 2.

The slats $a$ are provided each with a number of holes, into a greater or less number of which are inserted teeth D, held therein by nuts $e$. This arrangement permits of broken or bent teeth being easily removed and new ones substituted therefor, the teeth to be variously arranged, or a greater or less number employed, according to the quality or condition of the material to be distributed. Some of the slats may be in two parts, and the contiguous ends bolted to the central ring, C; and, again, where convenient, the slats may be secured to the heads and central ring by the teeth themselves, as is shown in Fig. 2.

In the heads I do not confine myself to the polygonal flanges shown, as they may be made circular, and the slats be bent to conform to the surface thereof.

F indicates the journals, secured in the heads B and supporting the drum in the rear end of the cart, the said drum connected to the drum-operating mechanism by means of the pinion G, as shown in Fig. 1 of the drawings.

It will be noticed that if one of the slats becomes damaged it can be easily removed, and a perfect one put in its place.

If advisable, spring-metal teeth may be used in lieu of malleable-iron or cast-iron teeth.

Having thus described my invention, what I claim, and desire to secure by Letters Patent, is—

1. In a fertilizer-distributer, the drum or beater composed of a number of thin metallic slats removably secured to the end pieces or heads and the central ring, C, and provided with teeth removably attached thereto, the end pieces or heads having the journals F, and the central supporting and retaining ring, C, substantially as shown and described.

2. The combination, with the backward-moving bottom of a fertilizer-distributer, of a rotating drum or beater arranged with relation to said bottom as shown, and composed of the end pieces or heads, the central supporting and retaining-ring, and the thin metallic slats secured to the heads and ring and provided with a number of teeth, substantially as described, and for the purpose set forth.

3. The combination, with the backward-moving bottom of a fertilizer-distributer, of a rotating drum or beater composed of thin metallic slats provided with a number of openings, and a less number of teeth removably attached to the slats in part of the openings, the end pieces or heads, and a central supporting and retaining ring, substantially as shown and described.

In testimony whereof I affix my signature in presence of two witnesses.

JOSEPH S. KEMP.

Witnesses:
E. J. TINKER,
JAS. H. LANGE.